Sept. 15, 1942.　　　V. R. ANDERSON　　　2,295,537
METHOD AND APPARATUS FOR PICK-UP AND DELIVERY BY AIRCRAFT IN FLIGHT
Filed May 29, 1940　　　5 Sheets-Sheet 1

INVENTOR.
Verne R. Anderson,
BY John B. Brady
ATTORNEY.

Sept. 15, 1942.   V. R. ANDERSON   2,295,537
METHOD AND APPARATUS FOR PICK-UP AND DELIVERY BY AIRCRAFT IN FLIGHT
Filed May 29, 1940   5 Sheets-Sheet 2

FIG_5

FIG_6

INVENTOR.
Verne R. Anderson,
BY
John B. Brady
Attorney

Patented Sept. 15, 1942

2,295,537

UNITED STATES PATENT OFFICE 2,295,537

METHOD AND APPARATUS FOR PICKUP AND DELIVERY BY AIRCRAFT IN FLIGHT

Verne R. Anderson, Tucson, Ariz., assignor of one-third to William H. Woodin, Jr., Tucson, Ariz.

Application May 29, 1940, Serial No. 337,922

6 Claims. (Cl. 244—137)

My invention is directed broadly to an improved and novel method of pick-up and delivery of loads for aircraft operation and more particularly to a method of pick-up and delivery in which greater speeds are obtainable than heretofore and in which unloading and loading may be rapidly accomplished without landing the aircraft.

One of the objects of my invention is to provide an improved method for unloading and loading aircraft while the aircraft continues in flight in which the load to be delivered is lowered in a predetermined path from the aircraft to an unloading and loading zone in which compensation is provided for wind friction on the cable and in which additional friction is introduced to steady the load on the cable as the cable approaches the unloading and loading zone.

Another object of my invention is to provide an improved method of unloading and loading aircraft while in flight wherein the path followed by a cable employed in the unloading and loading process may be predetermined after a full consideration of all factors concerned, such as speed and altitude of the aircraft, wind friction upon the cable, weight and length of the cable, weight of the load, the effects of gravity, inertia, condition of tension of the cable and other characteristics of the load.

Still another object of my invention is to provide a method of unloading and loading aircraft which includes the flying of the aircraft in a curved path over an unloading and loading zone and the lowering of a cable carrying the load in a predetermined path to a position over the unloading and loading zone whereby the end of the cable and load carried thereby describe a path in free air with the load moving at a sufficiently slow speed that the load may be readily detached from the cable and a substitute load attached thereto while the aircraft continues in flight.

A further object of my invention is to provide a method of unloading and loading aircraft in flight which consists in flying the aircraft in a substantially circular path above a loading and unloading zone while lowering a cable in a position to describe a predetermined path which is substantially an elliptic paraboloid in the air while introducing an additional steadying force as the load approaches the unloading and loading zone for thereby increasing the stability of the lower end of the cable in the unloading and loading zone.

A still further object of my invention is to provide an improved apparatus for use in unloading and loading aircraft in flight whereby stability of the load at the unloading and load-zone may be predetermined and assured.

Another object of my invention is to provide a novel construction of container for freight or other loads which may be unloaded or loaded from aircraft while in flight.

A further object of my invention is to provide a novel arrangement of mechanism for stowing freight on aircraft and unloading such freight from the aircraft while the aircraft is in flight.

Other and further objects of my invention reside in my improved method and apparatus for unloading and loading aircraft in flight as set forth more fully in the specification hereinafter following by reference to the accompanying drawings, in which:

Fig. 8 is a fragmentary cross sectional view showing the load transferring gondola in stored position on a transport plane.

My invention is directed to a practical method and apparatus for unloading and loading aircraft in flight. With the rapid increase in the use of air mail and air express service, the element of delivery time between distant Metropolitan areas has become an important financial problem. Efforts have been made to decrease delivery time in aircraft operation. It has been proposed to unload and load aircraft by various methods some of which have involved the use of a cable to guide or carry a load. However, after investigation of earlier methods I have found that such methods have failed to take into account considerations of air friction, and such factors as gravity, inertia, differences in tensions, speed, altitude and characteristics of the load so that it has been impossible to predetermine with accuracy the proper method of unloading and loading aircraft and the path of the aircraft to be followed. I have taken into consideration all of these factors in devising the method and apparatus of my present invention. For the purpose of explaining the method by which the loading and unloading of aircraft may be accomplished with the load maintained in a substantially steady state without landing the aircraft, it is important to consider the following factors:

COMPLETE SET-UP FOR STEADY STATE

Using polar coordinates, the components of the external forces acting on an element $ds$ of the cable are:

| Nature of force | R comp. | $\Theta$ comp. | Z comp. |
|---|---|---|---|
| Gravity | 0 | 0 | $-\sigma g\, ds$ |
| Inertia | $\sigma r \omega^2 ds$ | 0 | 0 |
| Air friction | 0 | $-Dr^2\omega^2\sqrt{dr^2+dz^2}$ | 0 |
| Difference in tensions | $d\left(T\dfrac{dr}{ds}\right)$ | $d\left(Tr\dfrac{d\theta}{ds}\right)$ | $d\left(T\dfrac{dz}{ds}\right)$ |

I would expect the air frictional force to act normal to the axis of the wire and to be of magnitude $D(V \sin \theta)^2$ per unit length, where $\theta$ is the angle between the wire and the velocity V, and D is the drag coefficient for $\theta = 90°$. However, the force tabulated is taken from the "Aviation Handbook" by Warner and Johnson. For equilibrium we have $$\frac{d}{ds}\left(T\frac{dr}{ds}\right) + \sigma \omega^2 r = 0$$

$$\frac{d}{ds}\left(Tr\frac{d\theta}{ds}\right) - D\omega^2 r^3 \sqrt{1 - r^2\left(\frac{d\theta}{ds}\right)^2} = 0$$

$$\frac{d}{ds}\left(T\frac{dz}{ds}\right) - \sigma g = 0$$

$$\frac{ds}{d\theta} = \sqrt{\left(\frac{dr}{d\theta}\right)^2 + \left(\frac{dz}{d\theta}\right)^2 + r^2}$$

I know of no way to solve the above three differential equations for T, $r$ and $z$ in terms of $\theta$. It may be possible, however, to use these to determine "similarity" conditions for model tests.

Since there is no simple general solution for the differential equations, it becomes necessary either to attempt a numerical solution or to make simplifying assumptions so as to obtain a solution which though not exact will give some insight as to what is happening.

A numerical solution would not be feasible unless reasonably accurate data were given, as is not the case. We shall hence use assumed data as a guide in making simplifying assumptions. The bases of these assumptions are as follows:

1. The weight of a large size full mail bag, such as would be carried in an aeroplane is 45 lb. Its dimensions are approximately 3 ft. long x 2 ft. in diameter.

There is also a small size bag which weighs 21 lb. and is 1½ ft. long x 1½ ft. in diameter, approximately. I am considering only the large size bag. For this the air friction is approximately .64 times the dynamic pressure on a flat plate of the same area as the projected area of the bag.

2. Data on the air friction of the cable was taken from Warner and Johnston, "Aviation Handbook," page 138.

3. Data on aeroplane performance were taken from the technical reports of the National Advisory Committee for Aeronautics. The data needed are the speed and radius for a circular flight. A rough estimate is 80 mi./hr. at a radius of 500 ft.

In report #153 (1922), in the reports of the National Advisory Committee for Aeronautics, on a type JN4h plane, data is given from which I conclude that the maximum feasible angular velocity is .3 rad./sec. at a radius of 400 ft. and a speed of 82 mi./hr.

Figures 12, 13, 14, 15, 16, 17, 18:
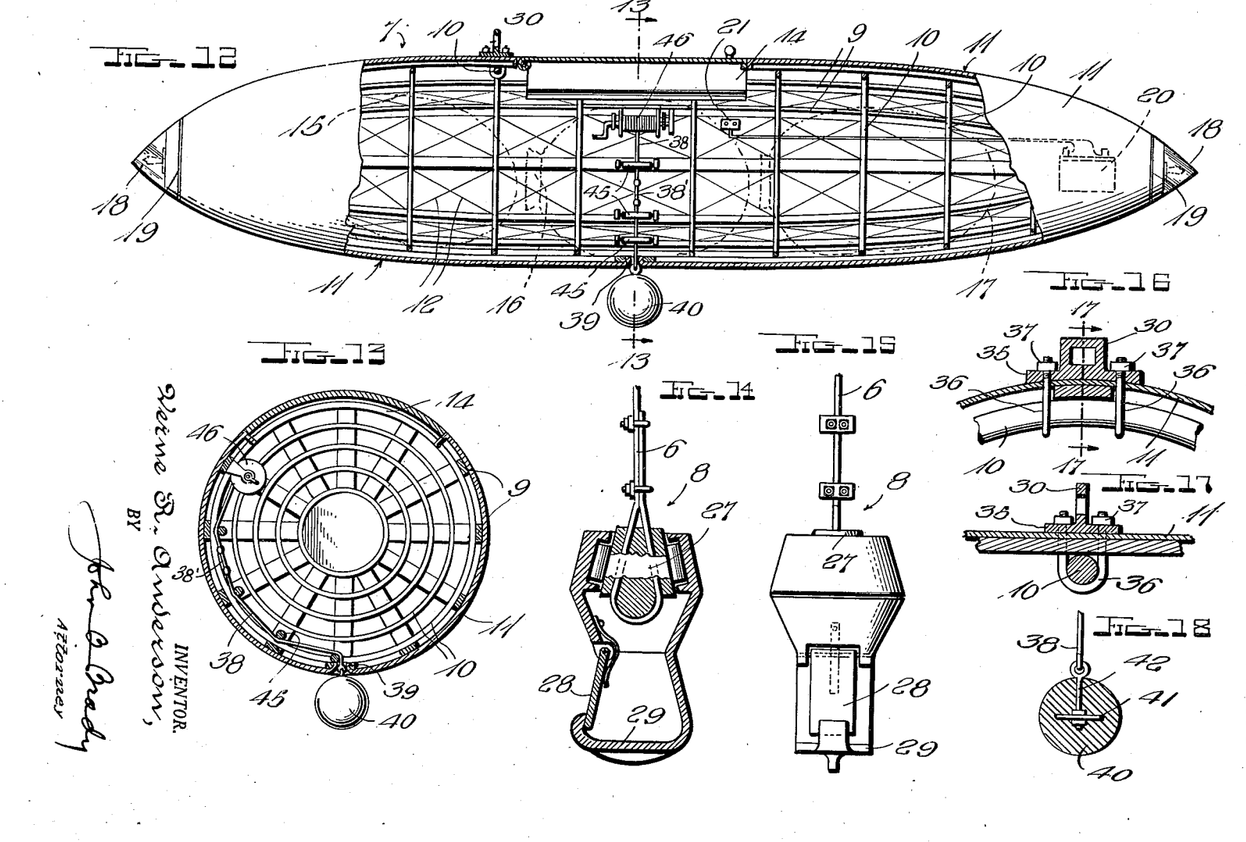
Fig. 12 is a side elevational view of the load transferring gondola employed in the pick-up and delivery system of my invention.
Fig. 13 is a transverse sectional view taken substantially on line 13—13 of Fig. 12.
Fig. 14 is a longitudinal sectional view taken through the gondola supporting swivel and hook.
Fig. 15 is a side elevational view of the gondola supporting swivel and hook shown in Fig. 14.
Fig. 16 is a fragmentary view showing the arrangement of supporting eyelet by which connection is made between the gondola and the swivel and hook attached to the suspending cable.
Fig. 17 is a fragmentary view through the suspension eyelet taken substantially on line 17—17 of Fig. 16.
Fig. 18 is a detail view showing the friction drag and the connection between the friction drag and the gondola.

In report #369 (1931) of the National Advisory Committee for Aeronautics, Fig. 17, a minimum radius of turn of 156 ft. at 76 mi./hr. is given; and a radius of 200 ft. at 88 mi./hr. is obtained, for which the angular velocity is .65 rad./sec. This is for a plane of type F6C-3. Similar data is given in report #386 (1931), Fig. 29, for a type F6C-4 plane.

The data given in the preceding paragraph is for combat aeroplanes of recent type, although I do not think that planes used for carrying mail could be maneuvered as easily as these. I consider that the 1922 data for combat planes would be nearer to the data for modern mail planes. I am assuming the following data as being about as favorable for the problem at hand as can be expected.

1. Speed=85 mi./hr.
2. Radius of flight=300 ft.
3. Angular velocity=.416 rad./sec.

The next step will be to consider a number of separate problems of increasing complexity. The first are simpler but deviate more from actual conditions; however, their solutions give a qualitative if not a detailed picture of what is happening. The more complex problems fit actual conditions better, and would give better detailed data; but the corresponding physical pictures are more difficult to see.

Figure 1:
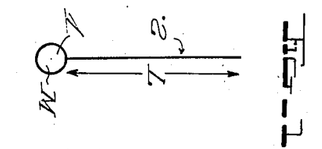
Figure 1 is a theoretical view illustrating the elements involved in the suspension of a load from an aircraft.

*Problem 1*—Consider a mass M designated by reference character 1 in (Fig. 1), suspended by a cord 2 of length L. The upper end of the string is moved in a horizontal circle of radius A at a constant angular velocity $\omega$. Find the motion of the weight.

Assumptions:
1. Neglect weight of cord.
2. Neglect all air friction.
3. The angle which the cord makes with the vertical is reasonably small. (Not much over 30°—at most.)

Figure 2:
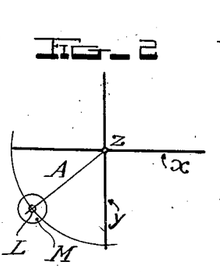
Fig. 2 is a theoretical view showing the relative coordinates with respect to which the movements of the load are determined.

On the top view, place coordinate axes as shown in Fig. 2. Let the coordinates of M be $(x, y)$ and those of the upper end of the string be $(x_0, y_0)$, then $$x_0 = A \sin \omega t, \quad y_0 = A \sin\left(\omega t + \frac{\pi}{2}\right)$$

Using complex notation and denoting complex numbers by bars, we have $$m\bar{\ddot{x}} + \frac{mg}{L}(\bar{x} - \bar{x}_0) = 0$$

$$m\bar{\ddot{y}} + \frac{mg}{L}(\bar{y} - \bar{y}_0) = 0$$

For the steady state $$m(j\omega)^2 \bar{x} + \frac{mg}{L}(\bar{x} - \bar{x}_0) = 0$$

$$\bar{x} = \frac{gA}{L\left(\frac{g}{L} - \omega^2\right)}$$

$$\bar{x} = \frac{A}{1 - \left(\frac{L}{g}\omega^2\right)}$$

$$\bar{y} = j\bar{x}$$

independent of M.

Since the motion is circular, $y$ need not be considered separately. On the top view, the cord is seen as a radial line, the weight being at a distance $$\frac{A}{1 - \frac{L}{g}\omega^2}$$

from the origin on the same side as the upper end.

As L is increased from zero, we should expect the weight to describe smaller circles than the plane and lie on the same side of the center as the plane until $$L = \frac{g}{\omega^2}$$

after which, the plane and the weight would lie on opposite sides of the center, the radius described by the weight being numerically $$R = \frac{A}{\frac{L}{g}\omega^2 - 1}$$

It may be noted that the critical value $$L = \frac{g}{\omega^2}$$

is the length of a simple pendulum of natural frequency, the same as that of the motion of the aeroplane.

Substituting the numerical data assumed for speed, radius of flight and angular velocity:

$$L_{critical} = \frac{g}{\omega^2} = \frac{32.2}{(.416)^2} = 186 \text{ ft.}$$

If L is taken as 3A, or 900 ft., the circle described by the weight is of radius $$R = \frac{300.}{\frac{900.}{32.2} \times .416^2 - 1} = 78.1 \text{ ft.}$$

The velocity of the weight is $78.1 \times .416 = 32.5$ ft./sec.

Problem 2.—Same as Problem 1, except consider the air resistance on the weight. This resistance is:

$$.64 \text{ (Projected area)} \frac{V^2 \rho}{2g}$$

where $\rho$ is the density of air and V is the velocity of the weight. This gives $$.64(3. \times 2.)\left(\frac{.0809}{2 \times 32.2}\right)V^2 = .00483 V^2 \text{ lb.}$$

(air at 0° C. and atmospheric pressure).

The ratio of air resistance to inertia force is:

$$\frac{.00483 V^2}{\frac{45. V^2}{32.2 R}} = .00346 R$$

For $R = 78.1$ ft. this ratio is .27. Since the air resistance and the inertia force are at right angles to each other, we should expect the air friction to have little effect, other than to alter the angle between the plane and the weight as seen, for example in Fig. 3. The plane is considered moving in path 3, while the load in the gondola is moving in path 4. With the weight at M, the plane would be at P' neglecting air friction, and at P if this friction is included.

It is not necessary to use this type of reasoning, however, for we may proceed as follows: Since the motion is circular it would not be affected by altering the law connecting air friction and velocity if the value given by the altered law were correct at the radius in question. We shall thus obtain the steady state solution for a frictional force $kV$, where $k$ is a constant and V is the velocity. This law makes the differential equations easily solvable. The right value of $k$ will be determined later. We have:

$$m\bar{\ddot{x}} + k\bar{\dot{x}} + \frac{mg}{L}(\bar{x} - \bar{x}_0) = 0$$

$$m(j\omega)^2 \bar{x} + kj\omega \bar{x} + \frac{mg}{L}(\bar{x} - A) = 0$$

$$x = \frac{\frac{mgA}{L}}{m\left(\frac{g}{L} - \omega^2\right) + jk\omega} = \frac{A}{\left(1 - \frac{L\omega^2}{g}\right) + \frac{jkL\omega}{mg}}$$

$$\bar{x} = R < \theta$$

Let $$\alpha = \frac{L\omega^2 - 1}{g}$$

$$\beta = \frac{kL\omega}{mg}$$

Then $$R = \frac{A}{\sqrt{\alpha^2 + \beta^2}} \quad ; \quad \theta = -\tan^{-1}\frac{\beta}{\alpha}$$

$$\theta = -\left[\pi - \tan^{-1}\frac{\beta}{\alpha}\right]$$

Since the motion is circular, it is not necessary to consider $y$ separately. R is the radius of the circle described by the weight. $-\theta$ is the angle by which the weight lags the plane, as seen from the origin in Fig. 3. If $\beta = 0$, we obtain the solution of Problem 1. It is evident that R is not much affected by $\beta$ unless $\beta$ is of the same order of magnitude as $\alpha$, or larger.

We shall now use this result to correct the numerical results of Problem 1, for air friction.

For $R=78.1$ ft. and $V=32.5$ ft./sec., the air resistance is:

$$.00483 \times 32.5^2 = 5.11 \text{ lb.}$$

This divided by V gives:

$$k = \frac{5.11}{32.5} = .157$$

$$\alpha = \frac{900 \times .416^2}{32.2} - 1 = 3.84$$

$$\beta = \frac{.157 \times 900 \times .416}{45} = 1.308$$

$$R = \frac{300}{\sqrt{3.84^2 \cdot 1.308^2}} = 73.9 \text{ ft.}$$

instead of 78.1 ft. obtained in Problem 1. The velocity of the weight is now $73.9 \times .416 = 30.7$ ft./sec.;

$$k = \frac{.00483 V^2}{V} = .00483 V = .1483$$

$\alpha$ is unchanged; but $$\beta = \frac{.1483 \times 900 \times .416}{45} = 1.234$$

and $$R = \frac{300}{\sqrt{3.84^2 \cdot 1.234^2}} = 74.3 \text{ ft.}$$

Since this is quite close to the previous value 73.9, it will not be further corrected, although this process could be repeated. We now have $$\tan^{-1} \frac{\beta}{\alpha} = \tan^{-1} \frac{1.234}{3.84} = \tan^{-1} .321 = 17.8°$$

$$180° - 17.8° = 162.2°.$$

Figure 3:
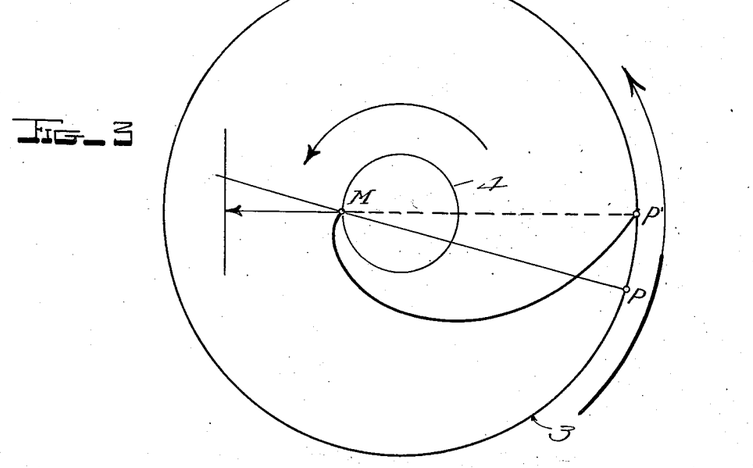
Fig. 3 is a theoretical plan view showing the elements involved in supporting a load in the steady state while suspended from a moving aircraft.

The weight hence lags behind the plane by an angle of 162.2°, as seen from the origin in Fig. 3.

It is evident that the air friction has little effect on R and causes a small decrease in the 180° angle by which the weight lagged the plane in Problem 1.

*Problem 3.*—Same as Problem 1, except that the weight of the cable is considered. All air friction is neglected.

For a stranded steel cable, ⅛" in diameter, the weight of 900 ft. is 29.5 lb. The force which brings it to the elastic limit of 36,000 lb./in.² is 348 lb.

$$\text{Safety factor} = \frac{348}{45+29.5} = 4.67$$

In my opinion, this cable is certainly as heavy as would be desired—perhaps somewhat heavier; yet, the whole cable weighs but little more than half as much as the lower weight. The differential equation for the cable is:

$$T \frac{\delta^2 x}{\delta z^2} = \sigma \frac{\delta^2 x}{\delta t^2}$$

where T is the tension and $\sigma$ is the mass per unit length. Using complex notation this becomes:

$$T \frac{d^2 \bar{x}}{dz^2} = -\sigma \omega^2 \bar{x}$$

$T = g[m + \sigma(L-Z)]$; however, to make the problem solvable, we give T a constant value, equal to the weight of the lower weight plus half the cable; thus $$T = g\left(m + \sigma \frac{L}{2}\right)$$

We then have approximately $$\bar{x} = C_1 \sin \gamma z + C_2 \cos \gamma z$$

where $$\gamma = \omega \sqrt{\frac{\sigma}{T}}$$

The distance between adjacent nodes is:

$$\delta = \frac{\pi}{\gamma} = \frac{\pi}{\omega} \sqrt{\frac{T}{\sigma}}$$

For the ⅛" cable $$T = 45 + 14.8 = 59.8 \text{ lb.}$$

$$\sigma = .001018 \text{ slugs/ft.}$$

$$\delta = \frac{\pi}{4.16} \sqrt{\frac{59.8}{.001018}} = 1828 \text{ ft.}$$

At $z=0$ $\bar{x}=\bar{x}_0=A$; hence $C_2=A$.
At $z=L$ $$m\left(\frac{\delta^2 x}{\delta t^2}\right)_L + T_L \left(\frac{\delta x}{\delta z}\right)_L = 0$$

$$-m\omega^2 \bar{x} + T_L \frac{d\bar{x}}{dz} = 0$$

where $T_L = mg$ $$-m\omega^2 (C_1 \sin \gamma L + A \cos \gamma L) + m g \gamma (C_1 \cos \gamma L - A \sin \gamma L) = 0$$

$$C_1 = \frac{A[\omega^2 \cos \gamma L + g\gamma \sin \gamma L]}{g\gamma \cos \gamma L - \omega^2 \sin \gamma L}$$

$$C_1 = \frac{A\left[1 + \frac{g\gamma}{\omega^2} \tan \gamma L\right]}{\frac{g\gamma}{\omega^2} - \tan \gamma L}$$

For a ⅛" cable and the numerical data assumed.

$$\gamma = .416 \sqrt{\frac{.001018}{59.8}} = .001718$$

$$\gamma L = 900 \times .001718 = 1.547 \text{ rad.}$$
$$= 88.6°$$

$$\tan \gamma L = 40.92$$

$$\frac{g\gamma}{\omega^2} = \frac{32.2 \times .001718}{.416^2} = .320$$

$$C_1 = A \frac{14.1}{-40.6} = -.347 A$$

$$\bar{x} = -104.1 \sin .001718 z + 300 \cos .001718 z$$

$$\bar{x} = 317. \cos\left(88.6 \frac{z}{L} + 19.1\right) \text{ degrees}$$

*Transient motion.*—The solutions computed, hereinbefore, are steady state motions. There is no question, but what these motions are stable and will actually occur sometime after the plane has begun to circle. Since the weight does not initially have its steady state motion, its actual motion differs from the steady state motion by an amount called the "Transient motion," since this transient motion dies out ultimately.

In Problem 1, the transient motion consists of an elliptical motion of the weight, the center of the ellipse being seen at the origin on the top view, the frequency being $$\frac{1}{2\pi} \sqrt{\frac{g}{L}}$$

or that of a simple pendulum of length L; and the initial values of the coordinates and the velocity components being the values obtained by subtracting the corresponding values for the steady state from those for the entire initial motion.

For $L=900$ ft. the frequency is .0301 cycle per second, which corresponds to a period of 33.2 seconds. The time required for the aeroplane to make one revolution is $$\frac{2\pi}{.416} = 15.1 \text{ sec.}$$

less than half the period of the transient motion.

At $z=L=900$ ft.

$$\sin \gamma L = .9997$$
$$\cos \gamma L = .0244$$
$$-104.1 \sin \gamma L = -104.1$$
$$300 \cos \gamma L = 7.3$$
$$(\bar{x})_{z=L} = -95.8 \text{ ft.}$$

The minus sign merely indicates that the weight lies on the opposite side of the center from the plane when seen in Fig. 3; hence $R=95.8$ ft.

Figure 4:
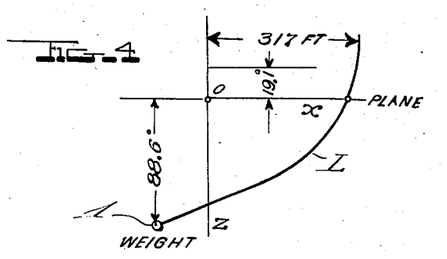
Fig. 4 is a theoretical view showing one relative arrangement of the load with respect to the aircraft in flight.

Fig. 4 shows the approximate curve in which the cable 2, which supports load 1, hangs, which is approximately ¼ cycle of a sine curve of amplitude 317 ft. placed, as shown. The related proportionate values have been indicated in Fig. 4.

The steady state motion is not obtained until the transient dies out, due to air friction; hence, the rate of damping is important. We shall consider this for the case of Problem 2, and shall find how the radius of a circular transient motion decreases with time. Remembering that for such a motion the kinetic and potential energies are always equal, we have the energy equation $$\frac{d}{dt}\frac{m(r\omega)^2}{2} = \frac{-(\lambda \omega^2 r^2)(\omega r)}{2}$$

where the air resistance is $\lambda V^2$. This gives $$\frac{1}{r^2}\frac{dr}{dt} = -\frac{\lambda \omega}{2m}$$

$$\int_{r_0}^{r}\frac{dr}{r^2} = -\frac{\lambda \omega}{2m}\int_0^t dt$$

$$t = \frac{2m}{\lambda \omega}\left(\frac{1}{r} - \frac{1}{r_0}\right) \text{ sec.}$$

For numerical data of Problem 2, $\lambda = .00483$, and $$\frac{2m}{\lambda \omega} = \frac{2 \times 45}{32.2 \times .00483 \times .416} = 1390$$

$$t = 1390\left(\frac{1}{r} - \frac{1}{r_0}\right) \text{sec.}$$

Evidently, if the final radius $r$ is small compared with the initial radius $r_0$, the term $$\frac{1}{r_0}$$

may be neglected in comparison with the term $$\frac{1}{r}$$

and the time required for the radius to die down to $r$ ft. is closely $$t = \frac{1390}{r} \text{ sec.}$$

regardless of the initial radius. Placing $r=25$ ft., for example, we have $$t = \frac{1390}{25} = 55.6 \text{ sec.}$$

During this time the plane would circle 3.7 times around.

Since the air resistance varies as $V^2$, I would expect any superimposed motion to increase the rate of damping; so that the transient would fade out more rapidly than is indicated above.

SUMMARY OF RESULTS

*Notation*

$A$ equals radius of circle described by aeroplane in ft.
$\omega$ equals angular velocity of aeroplane in radians/sec.
$L$ equals length of cable in ft.
$\sigma$ equals mass per unit length of cable in slugs/ft.
$T$ equals tension in cable in lb.
$M$ equals mass of weight in slugs.
$V$ equals velocity of weight in ft./sec.
$R$ equals radius of circle described by weight in ft.
$g$ equals acceleration of gravity in ft./sec.$^2$
$\theta$ equals angle by which weight lags the aeroplane seen from the center of flight on the top view.
The rectangular coordinate axes $x, y, z$ are placed with the origin at the center of flight of the aeroplane, and with the positive $z$ axis pointed straight down. The axes are stationary in space, and the coordinates are measured in feet.

*Numerical data assumed*

Speed of aeroplane equals 85 mi./hr.
Radius of flight of aeroplane equals 300 ft.
Angular velocity of aeroplane equals .416 radians/sec.
Length of cable equals 900 ft.
Cable is ⅛" diameter steel (provided with swivel at lower end).
Weight is a large size full mail bag weighing 45 lb. and having a projected area of 6 ft.$^2$.
Air resistance on weight is .64 times the dynamic pressure on the projected area, or .00483 $V^2$ lb.
Where numerical results are given, they were obtained by substituting this data, (except for modifications indicated), in the general formulas obtained.

*Summary of procedure*

The exact differential equations for the curve of the cable were set up; but these gave no information.

Next a number of separate problems were worked of increasing complexity, but increasing degrees of approximation to actual conditions. The solutions obtained depend upon the sine, tangent, and radian measure of the angle of inclination of the cable to the vertical being approximately equal, which assumption is justified by the numerical data obtained.

In all cases, the steady state motion consists of a rotation of the system as a whole about the $z$ axis with the same angular velocity as the aeroplane. This motion is stable and would be realized in somewhat less than a minute after the aeroplane started to circle.

The results of the specific problems were as follows:

*Problem 1.*—All air resistance is neglected, and the weight of the cable is neglected.

$$R \text{ equals } \frac{A}{\frac{\omega^2 L}{g} - 1} \text{ ft.; } \theta \text{ equals } 180°$$

For the weight to swing on the opposite side of the $z$ axis from the plane, $L$ must be larger than the critical value $$\frac{g}{\omega^2} \text{ ft.}$$

(for which length the natural frequency of the simple pendulum is that of the aeroplane rotation).

Numerically $R$ equals 78.1 ft., $\theta$ equals 180°

$V$ equals 32.5 ft./sec.; $L$ crit. equals $\frac{g}{\omega^2}$ equals 186 ft.

*Problem 2.*—Weight and air resistance of the cable are neglected. Air resistance on weight is considered.

$$R \text{ equals } \frac{A}{\sqrt{\alpha^2+\beta^2}}; \phi \text{ equals } 180° - \tan^{-1}\frac{\beta}{\alpha}$$

where $$\alpha \text{ equals } \frac{L\omega^2}{g} - 1$$

$$k \text{ equals } .00483\, R\omega$$

$$\beta \text{ equals } \frac{kL\omega}{mg}$$

First $k$ is put equal to 0 and R computed. Using this R, a new $k$ is computed and R recomputed. Stopping at this stage, we should have sufficient accuracy.

Numerically

R equals 74.3 ft.,
$\phi$ equals 162°,
V equals 31.0 ft./sec.

Comparing these results with those of Problem 1, we see that the air resistance on the weight affects R a little and causes a small deviation in the angle by which the weight lags the aeroplane.

*Problem 3.*—All air resistance is neglected. Weight of cable considered. In solving the differential equation, the tension in the cable is given the constant value $$\left(m + \frac{L}{2}\sigma\right)g$$

The cable lies in a plane passing through the $z$ axis. At a distance $z$ from the origin, the radius described by the cable is:

$$r = C_1 \sin \gamma z + A \cos \gamma z$$

where $$\gamma = \omega\sqrt{\frac{\sigma}{T}}$$

$$C_1 = \frac{A\left[1 + \frac{g\gamma}{\omega^2}\tan \gamma L\right]}{\frac{g\gamma}{\omega^2} - \tan \gamma L}$$

The cable thus hangs in a sine curve the distance between adjacent nodes of which is $$\frac{\pi}{\omega}\sqrt{\frac{T}{\sigma}}$$

The critical value of $L$, for which the denominator of $C_1$ vanishes, is $$\frac{1}{\gamma}\tan^{-1}\frac{g\gamma}{\omega^2}$$

R equals $C_1 \sin \gamma L + A \cos \gamma L$
$\theta$ equals 180°

Numerically

R equals 96.8 ft.
$\theta$ equals 180°.

The cable hangs in the curve $$r \text{ equals } 317 \cos\left(88.6\frac{z}{L} + 19.1\right)° \text{ ft.}$$

and occupies approximately one quarter cycle as illustrated.

L (critical) equals 180 ft.

The solution of Problem 3, can be easily adapted to take care of the air friction on the weight. In view of the results of Problem 2, however, it does not appear that this air friction greatly affects R.

By adding a term in the differential equation for Problem 3, the effect of the air friction on the cable can also be taken care of approximately, the method of solution being closely similar to that used in Problem 3. In such a case hyperbolic functions of complex arguments would be obtained instead of trigonometric functions of real arguments; however, there are tables of such functions, and the calculations are entirely feasible. Although the air friction is considerable toward the upper end of the cable, being (.0000380) (speed in mi./hr.)$^2$ lbs. per ft. for a $\frac{1}{8}$" cable, it does not appear that it could greatly reduce R; in fact it is not evident that it would reduce R at all.

By using an integral equation instead of a differential equation, it is possible and feasible to consider all effects together, including the variation of the tension with $z$, and thus to obtain a very close approximation to the actual behavior of the cable.

The refinements just outlined would not be justified unless more accurate data is given.

The above solutions are for steady state motion. The actual motion differs from this by a "transient motion" which dies out after a short time. This transient motion has been fully explained hereinbefore, and evidence is given that it becomes reasonably small after one minute regardless of what it was initially.

Figure 5:
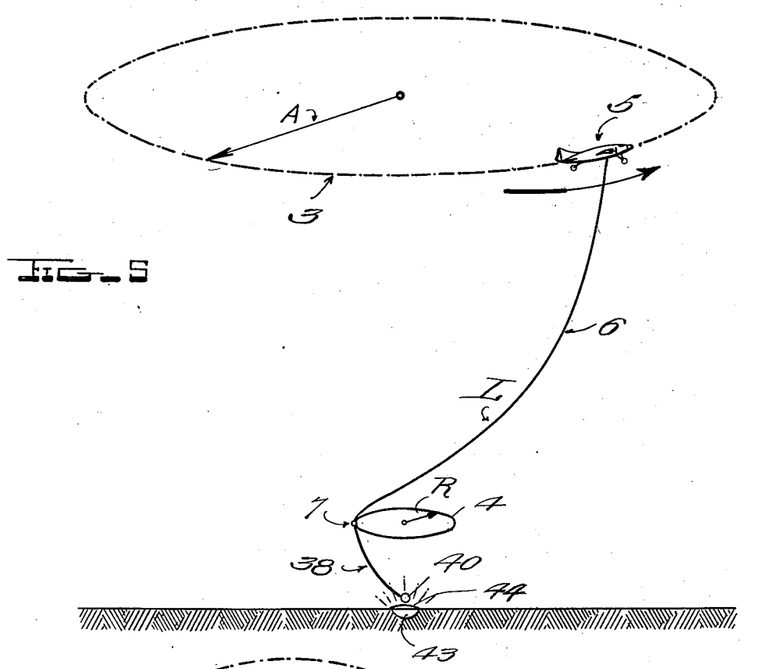
Fig. 5 is a flight diagram showing the manner in which a load suspended from an aircraft in accordance with my invention is maneuvered to a steady state condition for effecting a loading or unloading operation.

In Fig. 5 I have shown the path of flight of aircraft 5 by reference character 3. The path of flight has a diameter described by radius A. The cable 6 which is lowered from the aircraft designated hereinbefore by length L is selected to provide maximum tensile strength for required length considering the weight of the load carrier or gondola, the air drag on the cable and gondola and the weight of the cable required for different loads. I have compiled the following data for stranded steel cable.

CABLE SIZES AND LOADS

| Diameter | Weight per 1000 ft. | Breaking strength | Load recommended (max.) | Safety factor | Cable construction |
|---|---|---|---|---|---|
| | Pounds | Pounds | Pounds | Percent | Number of strands |
| $\frac{1}{16}$" | 8.8 | 500 | 250 | 100 | 19 |
| $\frac{5}{64}$" | 14 | 780 | 390 | 100 | 19 |
| $\frac{1}{8}$" | 35 | 2,100 | 1,050 | 100 | 19 |
| $\frac{3}{32}$" | 6.9 | 480 | 240 | 100 | 7x7 |
| $\frac{1}{8}$" | 27 | 1,350 | 675 | 100 | 7x7 |
| $\frac{3}{16}$" | 61 | 3,200 | 1,600 | 100 | 7x7 |
| $\frac{1}{8}$" | 27 | 2,000 | 1,000 | 100 | 7x19 |
| $\frac{3}{16}$" | 60 | 4,200 | 2,100 | 100 | 7x19 |

NOTE.—Maximum recommended load includes weight of the amount of cable in use, weight of the gondola, air drag on the gondola, weight of actual packages or package being picked up or lowered and air drag on cable.

The load carrier or gondola indicated at 7 in Fig. 5 is connected through a swivel 8 with the end of cable 6. The gondola 7 is shown more particularly in Figs. 12 and 13 constructed from longitudinally extending ribs 9 interconnected by strengthening transversely disposed ribs 10 which are enclosed by a light weight metallic covering 11. The ribs 9 and 10 may be reinforced by use of diagonal braces indicated at 12. The metallic covering 11 is streamlined in shape for reducing head resistance on the load carrier. The load carrier is provided with a hatch opening 14 in one side thereof through which the load such as express packages or mail bags indicated at 15, 16 and 17 may be passed in loading or unloading the load carrier. The load carrier is provided with illuminating means for visually indicating the limits of the carrier. I have shown the illuminating means as replaceable light assemblies 18 adapted to fit into recesses 19 in the opposite ends and sides of the load carrier. The illuminating means requires a minimum amount of side wall space and does not interfere with the space for storage within the load carrier. The illuminating means however does perform a valuable function in rendering the load carrier visible in fog and darkness and enabling the attendant on the ground to readily locate the load carrier for removing the load therefrom and replacing a renewal load therein. The lights 18 are energized from a replaceable battery 20 under control of a switch 21 external to the load carrier. The switch may be thrown to energize the illuminating means when the load carrier is discharged from the aircraft shown in Figs. 7, 8 and 9.

Figure 7:
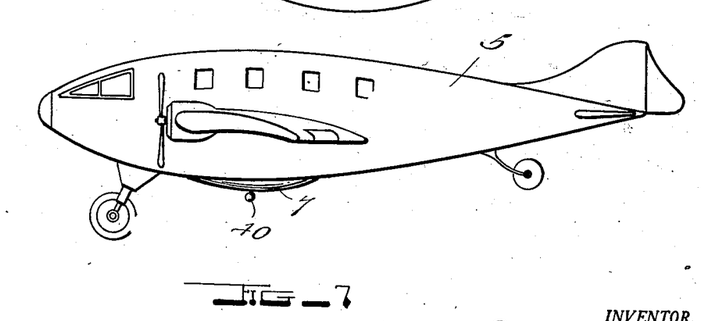
Fig. 7 is a side elevational view of a transport plane equipped with a loading and unloading system in accordance with my invention.
Figures 9, 10, 10A:
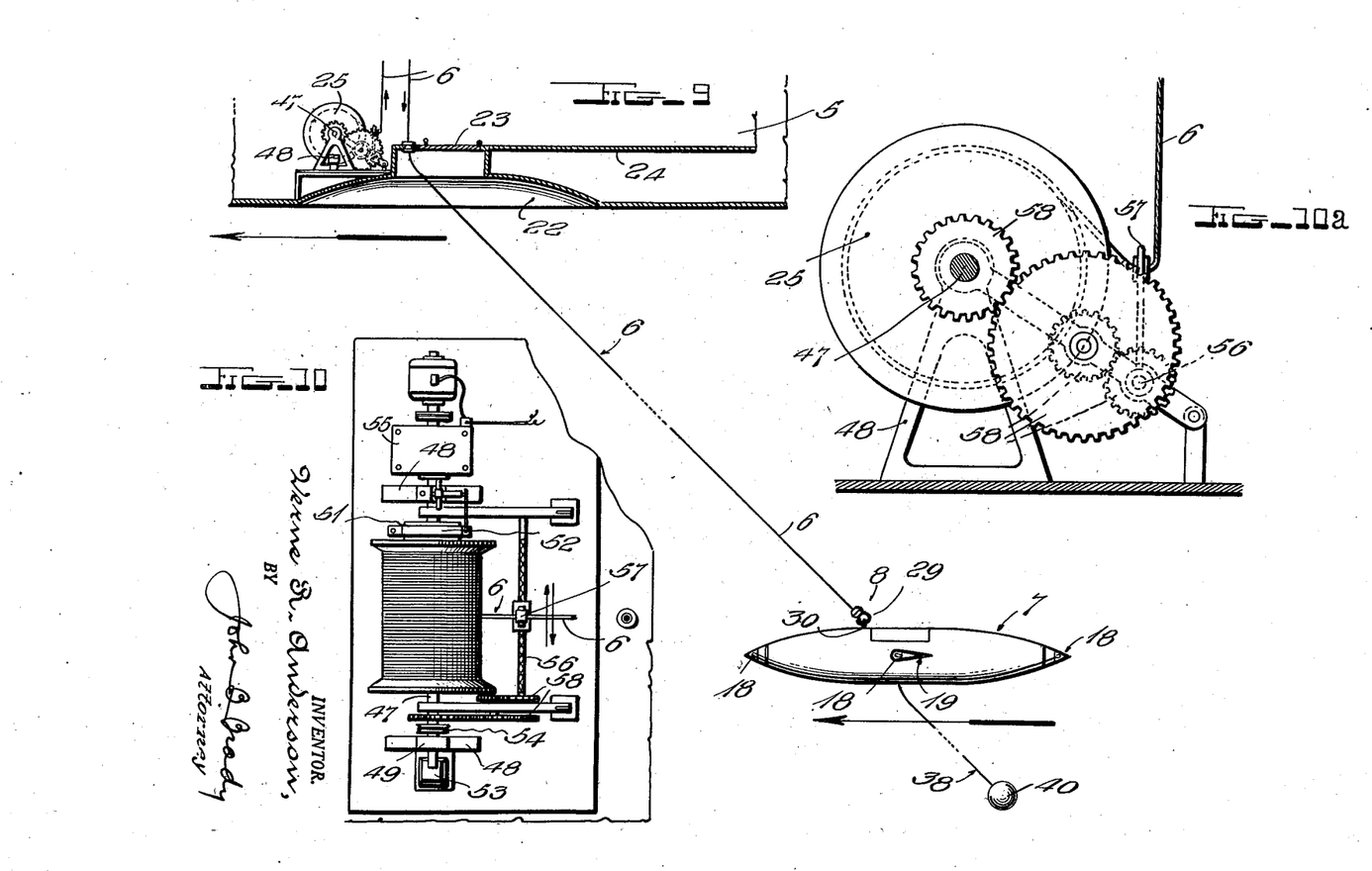
Fig. 9 illustrates the transfer gondola in released position with respect to the transport plane in the process of being lowered or raised with respect to the aircraft.
Fig. 10 is a fragmentary plan view of the cable reeling equipment carried aboard the aircraft.
Fig. 10a is an end elevational view of the cable guiding mechanism associated with the reeling mechanism illustrated in Fig. 10.
Figure 10:
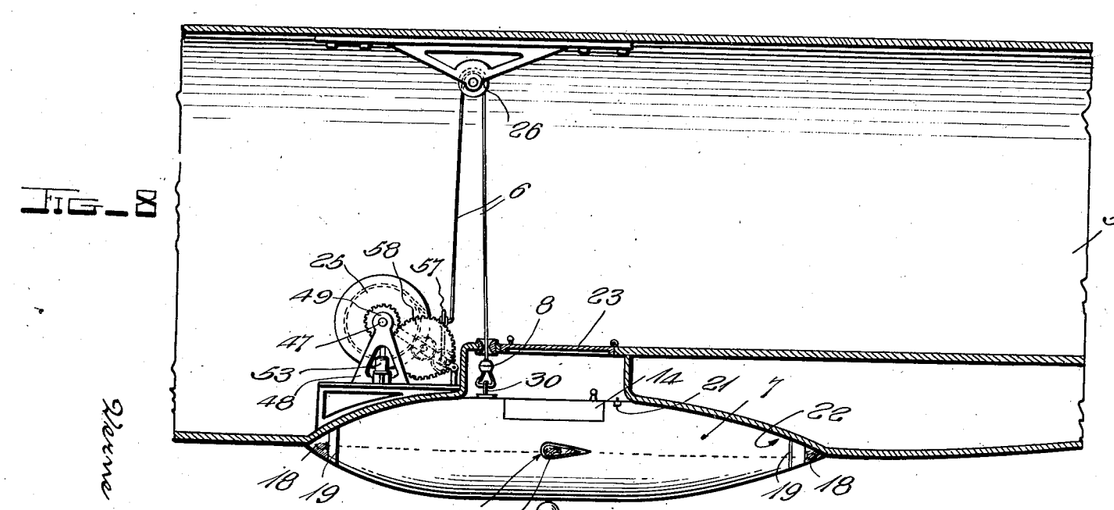
Figure 11:
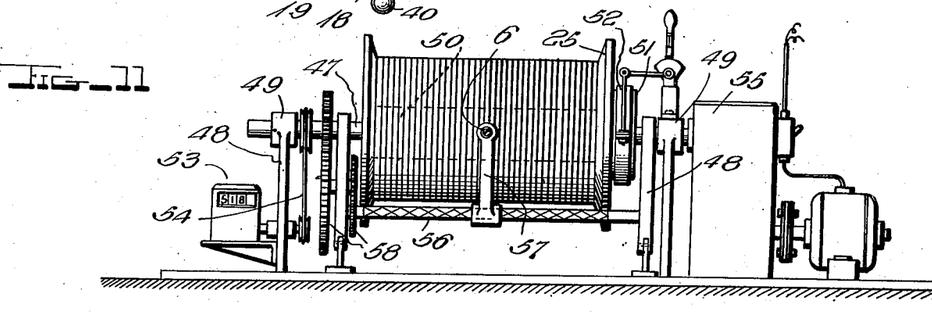
Fig. 11 is an elevational view of the cable reeling mechanism illustrated in Fig. 10.

For purposes of explaining my invention, I have shown in Figs. 7, 8 and 9 the manner of supporting the load carrier 7 with respect to the fuselage of the aircraft indicated at 5. A recess 22 is provided beneath the fuselage of the aircraft for receiving and substantially encompassing the load carrier 7 in a streamlined manner when the load carrier 7 is stored on the aircraft. The load carrier 7 is so positioned in recess 22 that the hatch 14 therein registers with the hatch 23 in the floor 24 of the fuselage enabling the operative to readily transfer express packages or mail sacks from the aircraft to the load carrier. The load carrier is secured in position by reeling cable 6 upon drum 25 illustrated in Figs. 9, 10, 10a and 11. Drum 25 and its associated equipment is disposed as near the center of gravity and center of lift as possible. Guide pulleys 26 are arranged interiorly of the fuselage for distributing the load factor as evenly as possible through the fuselage structure and as near in alignment with the center of lift and center of gravity as possible. The cable 6 is made detachable with respect to the load carrier 7 as it may be desirable to substitute a load carrier at the unloading and loading zone. The detachable mechanism is shown more particularly in Figs. 14 and 15 in which the end of cable 6 is looped through a clamp 27 having a spring actuated closure 28 operating in coaction with a hook-shaped member 29. The hook-shaped member 29 detachably engages with the eyelet 30 which is secured to the load carrier 7 at 8 as shown more particularly in Figs. 16 and 17. The eyelet 30 is secured to plate 35 which is clamped by means of U-bolts 36 and coacting nuts 37 around the laterally extending rib 10 of the load carrier.

The load carrier 7 has a flexible member 38 extending through one side thereof at 39 diametrically opposite the connection of cable 6 through swivel 8. The flexible connection 38 may be in the form of a cable of lighter size and smaller tensile strength than cable 6 or cable 38 may contain links corresponding to links as at 38' of a chain and include a frangible link adapted to be severed under conditions of excessive strain. Flexible connection 38 passes through one side of the load carrier 7 at 39 and around pulley members 45 terminating in a reel 46 immediately below hatch 14. This is necessary because when the carrier 7 is stowed on the aircraft the operative reaches through hatch 23 in the fuselage and hatch 14 in the carrier 7 and grasps handle of reel 46 and reels up the connection 38, thereby storing drag 40 closely adjacent the side wall of the loaded carrier 7. After the handle 46 has been reeled up to draw connection 38 into the hatch, the reel may be suitably secured or latched within the carrier 7 ready for release when the carrier is again loaded for descent.

At the end of connection 38 I provide a drag indicated generally at 40 and shown more particularly in Fig. 18. The drag 40 may be in the form of a resilient spherical member having embedded therein a securing plate 41 to which is connected the attachment member 42 to which is in turn secured the connection member 38. The purpose of the drag 40 will be understood more particularly from Figs. 5 and 6 wherein it is shown that as the loaded carrier 7 moves in an orbit at reduced speed compared to the velocity of the plane 5 in a circular path 3, flexible member 38 with drag 40 attached, gravitates to a position in which drag 40 contacts the surface of the unloading and loading zone, thereby increasing the centripetal force on the loaded carrier for stabilizing the loaded carrier 7 which has already reached the substantially steady state and facilitating the unloading, loading or replacement thereof on the end of the cable.

The forces acting on the loaded carrier may be designated as gravitational, centrifugal, tensional and stabilizing, the former two being at 90° with respect to each other. The tensional force, supplied through the supporting cable, acts at various angles and is required to provide vertical and contripetal components adequate to balance the gravitational and centrifugal forces during the lowering of the carrier; this is effected with reasonable stability, but as the carrier approaches the ground and the problem of reaching it becomes acute, I have found that means for improving the stability of the system are required. I, therefore, provide a stabilizing force by means of the drag 40 and flexible member 38, which introduce an additional centripetal component, without adding materially to the gravitational force as the drag 40 is a relatively small mass and rests on the ground at this phase of the operation. Tension in the main cable 6 is thus relieved to some extent when the drag 40 contacts the ground, and as the drag 40 quickly assumes an axial position with respect to both the larger circular path of the aircraft and the smaller circular path of the carrier, the system becomes stabilized to a degree not heretofore achieved. It remains then for the ground crew only to seize the drag 40 and, manually or by machine, to secure the carrier in axial position where the unloading and reloading operations may be expeditiously performed.

The length of the flexible member 38 is predetermined by the projected radius of the carrier path for the altitude and radius of flight of the aircraft, and set accordingly by operation of the reel 46 prior to closing the hatches 14 and 23 and lowering the carrier. The movements of the drag 40 in flight follow generally those of the larger and dominant mass of the carrier, but when the drag contacts the ground stabilization ensues, as above described, with the drag 40 in axial position.

Figure 6:
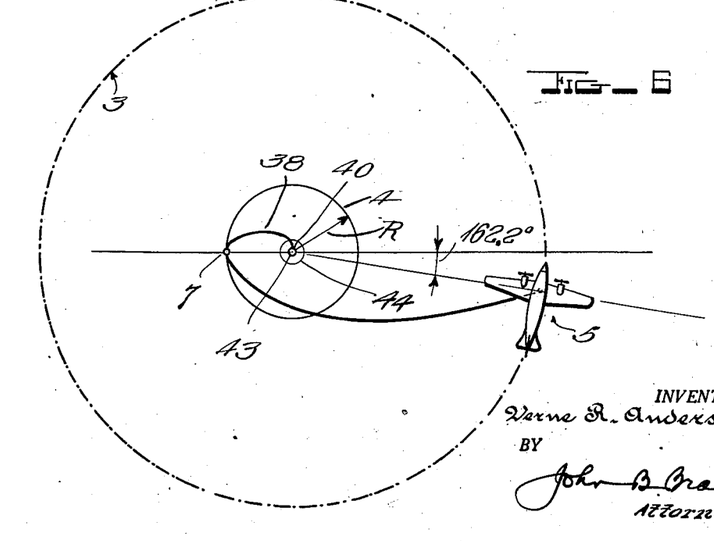
Fig. 6 is a theoretical plan view of a flight diagram showing a load being maneuvered to a steady state condition during the flight of an aircraft.

As indicated in Figs. 5 and 6, the center of the unloading and loading zone indicated generally at 43 is marked by suitable means such as light 44 with which he endeavors to align the loaded carrier while the pilot maneuvers the aircraft 5 in a substantially circular path 3. The drag 40 and connection 38 also serve to stabilize loaded carrier 7 while it is being lowered to the substantially steady state position. However, when the loaded carrier 7 is stored aboard the aircraft, the streamlined shape of the carrier substantially conforms with the streamlining of the aircraft as shown more particularly in Figs. 7 and 8. It will be seen that the loaded carrier is raised by operation of the reeling mechanism which stores cable 6 on drum 25 in a position in which hatch 14 is directly beneath hatch 23. This permits the operative on the aircraft to remove packages or mail sacks from the gondola or to store packages or mail sacks in the gondola and at the same time reach control switch 21 for either lighting or extinguishing the illuminating means and reach the reel 46 for reeling in or out the friction drag 40. The center of gravity of the loaded carrier 7 when loaded is made to conform as closely as possible with the center of gravity of the aircraft. The suspension means constituted by cable 6 leading from pulley 26 extends from a bracket secured to the structure of the aircraft substantially above the hatch 23 so that the gondola 7 may be moved into the recesss 22 in a position in which the gondola 7 is centered and confined within the recess 22 ready for an unloading or loading operation.

The reeling mechanism for storing the main cable 6 is shown more particularly in Figs. 9, 10, 10a and 11. Drum 25 is carried by shaft 47 journaled in standards 48 which support antifriction bearings 49 providing journals for the shaft 47. The core of the drum 25 is indicated at 50 providing a support for coiling the cable 6 which is raised and lowered through the floor 24 of the aircraft as represented in Fig. 9. I provide a brake drum 51 attached to drum 25 over which the brake lining or band 52 functions for controlling the speed of the cable lowering operation. In order to determine the number of feet of cable which has been unreeled or which is still to be reeled in, I provide a counter mechanism shown generally at 53 suitably driven from shaft 47 through such means as belt or chain indicated generally at 54. In order to drive the drum 25, I provide a suitable gear box 55 at one end of the drum which is driven through a chain or system of gears from a suitable prime mover such as a gasoline engine or an electric motor. In order to control the feeding of the cable in uniform manner in winding or unwinding with respect to the drum 25, I provide a feeder mechanism shown generally in Figs. 10 and 11 in which spirally cut shaft 56 drives guide 57 in a limited path transversely of the reel for guiding the cable on or off the drum. A connection is provided between main shaft 47 and the spiral cut shaft 56 through gear system 58 which predetermines the speed of the guide 57 with respect to the speed of the winding or unwinding process. In this manner, the lowering or raising of the cable may be accurately controlled having regard to all of the forces acting upon the cable as heretofore explained, to wit: angular velocity of the aircraft, the cable and the load carrier, the force of gravity, inertia, air friction and difference in tensions. It is only by consideration of all of these forces and compensating therefor that the cable may be made to descend in a predetermined path to align the load with the unloading and loading zone.

To facilitate the alignment of the load carrier with the unloading and loading zone, I may employ radio communication means between the operative on the aircraft and the operative at the unloading and loading zone whereby the pilot may be informed by this auxiliary means as to the position of the load carrier. The cable forms a curve through the air as heretofore explained and as the aircraft continues in a circular path, the air resistance against the cable serves to absorb shock. By this arrangement there is substantially no impact force which is so apparent in systems employing linear pick-up and delivery. The pick-up and delivery according to my system is substantially free of shock thereby improving efficiency with respect to operation of the aircraft and the unloading and loading process. The control and balance of the aircraft are not affected by reason of location of equipment or the point at which the cable leaves the aircraft. No special skill is required on the part of the pilot or operative in the aircraft and no special training in the operation of the plane to facilitate the carrying out of my method is necessary. The load may be started from a position of rest and the velocity thereof increased over a controllable period of time in the method of my invention thereby governing the amount of stress on both the aircraft and the cable.

I have described my invention in certain of its preferred embodiments but I desire that it be understood that modifications may be made and I intend no limitations upon my invention other than may be imposed by the scope of the appended claims.

What I claim as new and desire to secure by Letters Patent of the United States is as follows:

1. Apparatus for unloading and loading aircraft comprising in combination with an aircraft, a load carrier, a cable connected with said load carrier and means for freeing and retrieving said cable operable to lower or raise the load carrier with respect to the aircraft, a frangible connector, a friction shoe pendently supported by said frangible connector, and a connection between said load carrier and said frangible connector, said friction shoe being adapted to establish frictional engagement with the unloading and loading zone at a predetermined limited distance below said load carrier while said load carrier remains pendently supported from the aircraft.

2. Apparatus for unloading and loading aircraft comprising in combination with an aircraft, a load carrier, a cable connected with said load carrier and means for freeing and retrieving said cable operable to lower or raise the load carrier with respect to the aircraft, a frangible connector, a resilient member pendently supported by said frangible connector, and a connection between said load carrier and said frangible connector, said resilient member being adapted to establish engagement with the unloading and loading zone at a predetermined limited distance below said load carrier while said load carrier remains pendently supported from the aircraft.

3. Apparatus for unloading and loading aircraft comprising in combination with an aircraft, a load carrier, a cable connected with said load carrier and means for freeing and retrieving said cable operable to lower or raise the load carrier with respect to the aircraft, a frangible connector, a drag pendently supported by said frangible connector, and a connection between said load carrier and said frangible connector said drag being adapted to establish a substantially fixed engagement with the unloading and loading zone while said carrier remains pendently supported from the aircraft.

4. The method of unloading an aircraft in flight which includes lowering a cable and attached carrier from the aircraft, flying the aircraft in approximate circles above the landing point, whereby the carrier describes approximate circles of small radius at limited speed closer to the ground, suspending a drag from said carrier, and causing the drag to contact the ground substantially at the landing point for stabilizing the substantially circular movement of said carrier, whereby said carrier may be expeditiously secured and unloaded for return to the aircraft.

5. The method of loading an aircraft in flight which comprises lowering a cable and attached carrier from the aircraft, flying the aircraft in approximate circles above the landing point, whereby the carrier describes approximate circles of small radius at limited speed closer to the ground, suspending a drag from said carrier, causing the drag to contact the ground substantially at the landing point for stabilizing the substantially circular movement of said carrier, securing said carrier, loading the carrier, freeing the loaded carrier for stabilized substantially circular movement as before, and raising the loaded carrier and the suspended drag to the aircraft.

6. The method of transferring loads by cable and carrier between an aircraft in flight and the ground which comprises flying the aircraft in a substantially circular path of substantially constant radius and at a definite altitude above the landing point; suspending a drag from the carrier at a distance dependent upon the radius of flight A, the angular velocity $\omega$ and altitude of said aircraft, and the projected radius of movement R of said carrier; lowering the carrier and suspended drag by said cable with said carrier in substantially circular movement until the radius R of the path is substantially equal to $$\frac{A}{\frac{L}{g}\omega^2 - 1} + K$$

where L is the length of cable lowered, $g$ is the gravitational factor (32.2), A and $\omega$ are the radius and angular velocity of flight of the aircraft, and K is a correctional factor dependent upon air friction and the weight of the cable, whereby said drag contacts the ground substantially at the landing point and serves to stabilize the substantially circular movement of said carrier; securing the carrier at the landing point, transferring a load between the carrier and the ground, freeing the carrier for stabilized substantially circular movement as before, and raising the carrier and the suspended drag to the aircraft.

VERNE R. ANDERSON.